(12) United States Patent
Facciano et al.

(10) Patent No.: US 6,548,794 B2
(45) Date of Patent: Apr. 15, 2003

(54) DISSOLVABLE THRUST VECTOR CONTROL VANE

(75) Inventors: Andrew B. Facciano, Oro Valley, AZ (US); Paul Lehner, Green Valley, AZ (US); Wayne N. Anderson, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/804,897

(22) Filed: Mar. 13, 2001

(65) Prior Publication Data

US 2002/0130216 A1 Sep. 19, 2002

(51) Int. Cl.[7] .................................................. F42B 10/00
(52) U.S. Cl. ...................... 244/3.1; 244/3.25; 244/3.22; 244/52; 60/230; 239/265.15
(58) Field of Search .............................. 244/52, 51, 62, 244/3.1, 3.22, 3.21, 3.24, 3.23, 3.25, 3.26, 3.27, 3.28, 3.29; 60/230; 102/380; 239/265.19, 265.15

(56) References Cited

U.S. PATENT DOCUMENTS

| | | | |
|---|---|---|---|
| 3,447,465 A | * | 6/1969 | White |
| 3,468,127 A | * | 9/1969 | Rosser |
| 3,635,404 A | * | 1/1972 | Hopkins et al. |
| 3,776,466 A | * | 12/1973 | Ray |
| 4,497,460 A | | 2/1985 | Thorsted et al. ............. 102/380 |
| 4,844,380 A | | 7/1989 | Peoples et al. ............. 244/3.21 |
| 5,082,202 A | * | 1/1992 | Jacobson |
| 5,320,304 A | | 6/1994 | Danielson ................... 244/3.21 |
| 5,511,745 A | | 4/1996 | Faupell et al. .............. 244/3.22 |
| 5,806,791 A | | 9/1998 | Hatalsky et al. ........... 244/3.24 |

OTHER PUBLICATIONS

Valentine, P. and Trester, P.; Reaction Sintering: A Method for Achieving Adherent High–Temperature Coatings on Carbon–Carbon Composites; Jun. 1991; General Atomics Project 4447.

* cited by examiner

Primary Examiner—Galen L. Barefoot
(74) Attorney, Agent, or Firm—Renner, Otto, Boisselle & Sklar, LLP (57) ABSTRACT

A dissolvable jet vane (22/30) is a composite structure, having a support frame (38), a plug leading edge (40) connected to the forward edge (42) of the frame (38), and an insulation layer (44) on the side walls of the support frame (38). The dissolvable jet vane materials withstand the pressure and thermal loads associated with missile steering during the first few seconds of rocket boost until the missile attains sufficient speed to use conventional external aerodynamic control fins for steering control. Once control passes to the external fins, the jet vanes rapidly and uniformly dissolve in the exhaust stream. The dissolvable jet vane provides a lightweight, reliable means of removing steering jet vanes from the exhaust stream of a solid rocket motor nozzle.

43 Claims, 6 Drawing Sheets

DISSOLVABLE THRUST VECTOR CONTROL VANE

This invention was made with Government support under Contract Number DASG60-98-C-0061 awarded by the U.S. Department of the Army. The Government has certain rights in this invention.

FIELD OF THE INVENTION

The present invention relates to a missile control system, and more particularly, to a thrust vector control vane and system mounted in the aft portion of a missile and used for steering the missile during launch, as well as a method of making and a method of using such a control vane.

BACKGROUND OF THE INVENTION

Aircraft and offensive missiles, including some cruise missiles, for example, often fly at low altitudes to avoid detection by enemy radar. In such situations the target, such as a ship, may have only a few seconds to both identify the threat posed by the incoming aircraft or missile and take countermeasures, such as firing a defensive missile. Thus, it is desirable to have a defensive missile locate and disable the offensive missile very quickly.

Land or ship borne defensive missiles generally are launched from a canister in a substantially vertical orientation. Missiles generally have steering control systems which include external aerodynamic control surfaces for guiding the missile. Before its aerodynamic control surfaces or fins are able to affect any significant maneuvers, the missile must achieve a certain minimum velocity, referred to herein as the aerodynamic control velocity, to cause enough air to flow over the aerodynamic control surfaces and provide aerodynamic control. For a ballistic launch trajectory, the missile reaches an altitude of thousands of feet before the aerodynamic control surfaces can cause the missile to pitch over and begin seeking the incoming missile threat. As a result a ballistic launch trajectory is inefficient, time consuming, and limits the missile sensor line-of-sight capabilities for optimum target detection and tracking.

A number of systems have been developed in an attempt to maneuver the missile prior to reaching an aerodynamic control velocity and to decrease reaction time after sensing an incoming threat. However, most current devices, although generally acceptable for some uses, have been found to be inadequate for many applications. Detachable jet tab systems, for example, formed of auxiliary propulsion units mounted to missile fins conflict with folding control surfaces. Folding control surfaces generally are necessary for any missile to be loaded into a launch canister having stringent volume constraints. Detachable jet tab systems require increases in the launch canister cross-sectional area for additional volume taken up by the jet tabs external to the missile fuselage.

Existing systems generally also can be classified as either nondetachable or ejectable, the latter often incorporating redundant control electronics. Nondetachable systems limit mission range and performance with rocket thrust degradation throughout the missile trajectory. Detachable, self-actuation mechanisms are substantially heavier and inherently more complicated than nondetachable systems. The increased complexity leads to reduced reliability, and the added weight requires more rocket propellant for missile launch and flight to the target. An actively detachable system generally uses a pyrotechnic actuated ejection mechanism and disengageable power coupling drive that introduces weight, complexity, and multiple operational failure risks. Furthermore, the act of ejecting the control system can knock the missile off its intended trajectory.

To overcome the deficiencies of prior systems, systems have been developed that place a mechanism in the exhaust plume of the rocket engine for control purposes, providing control immediately upon launch. Generally, the purpose is to pitch the missile over (rotate the missile about an axis transverse to the longitudinal axis and previous direction of flight during launch) and to avoid rolling. Rolling generally interferes with operation of the missile guidance system and is a problem that is minimized at low velocities by placing the control surfaces within the exhaust plume.

So-called "erodible" control surfaces have been developed that are placed in the path of rocket engine exhaust and break apart after a period of time. However, these often break apart in larger pieces than generally is acceptable. It would be desirable to avoid ejecting large pieces of material from the missile during launch and flight.

SUMMARY OF THE INVENTION

The present invention provides a thrust vector control jet vane, a jet vane control system and a missile incorporating such jet vanes, as well as a method of making such jet vanes. The jet vanes form aerodynamic surfaces for generating vehicle maneuvering forces by diverting the propellant plume at missile launch. As an aerodynamic control velocity is achieved and the aerodynamic control surfaces external to the vehicle airframe assume command authority, the jet vanes dissolve into granular particulates in the propellant plume. Therefore, rocket motor propulsion efficiency or specific impulse is not degraded beyond that required to perform launch maneuvers, reaction time is decreased, and the missile exhibits improved kinetic performance during the aerodynamic control phase of the powered flight to the target.

Dissolvable jet control vanes provide numerous advantages in the design, construction and/or performance of a missile. For example, dissolvable control vanes eliminate or minimize the often tortuous practice of determining the least desirable inefficiency to the overall missile system. The control vanes gracefully disintegrate in a timely basis, providing a disposable control vane for maneuvering the missile for pitch, yaw and roll control immediately upon launch. Rocket motor propulsion efficiency or specific impulse is not degraded beyond that required to perform the launch maneuvers, hence the missile exhibits improved kinetic performance during the powered flight phase to the target. Interception of highly mobile targets at an extended range is further enhanced by dissolvably jettisoning the control vanes after pitch-over. Ease of thrust vane control operation without the activation of pyrotechnic-actuated ejection mechanisms and greater reliability resulting from system simplification are additional advantages that also lead to cost and risk reduction.

Dissolvable control vanes are possible through the utilization of multiple advanced composite materials designed to perform different individual functions on a time limited basis, yet integrated or colaminated together to achieve a combined, pre-programmed structural capability by taking advantage of their known high temperature performance characteristics and environmental limitations. As a result, failure of the composite control vanes produced in accordance with the present invention can be precisely controlled in a manner unforeseen in prior "erodible" material designs. The composite dissolvable jet vanes also provide an inexpensive, disposable thrust vector control methodology for retrofitting high performance missiles for low speed surface launch applications with thrust vector control requirements.

The dissolvable jet vane provides a lightweight, reliable means of removing steering jet vanes from the exhaust stream of a solid rocket motor nozzle. The dissolvable jet vane materials withstand the pressure and thermal loads associated with missile steering during the first few seconds of rocket boost until the missile obtains sufficient speed to use conventional external aerodynamic control surfaces for steering control. Once control passes to the external fin, the jet vanes rapidly and uniformly dissolve in the exhaust stream.

According to one aspect of the invention, a dissolvable thrust vector control vane includes a frame and a thermal protection layer on at least a portion of the frame. In accordance with one embodiment of the invention, the dissolvable control vane further includes an erosion-resistant material on at least a forward edge of the frame. The erosion-resistant material forms an insert that is mounted to the forward edge of the frame; the insert includes a carbon-carbon structure and a surface coating on the structure selected from a group including a ceramic, a carbide, and a metallic material; the surface coating includes one or more materials selected from the group including a hafnium-diboride ceramic, a zirconium-diboride ceramic, a hafnium-carbide, a tantalum-carbide, or a metallic rhenium refractory coating; the surface coating generally has a thickness of less than about five thousandths of an inch (0.127 mm) thick; the insert further includes one or more materials selected from a group including ceramic and oxide-based oxygen permeability and volatility barriers; the insert has a generally T-shape cross-section with the tail of the T connected to the frame; and/or the insert has a generally U-shape cross-section with the open end of the U attached to the frame.

According to one or more embodiments of the invention, the frame includes graphite-reinforced organic resins; the graphite-reinforced organic resins are carbon-reinforced, high temperature organic resins that include one or more resins selected from a group including: PMR-15 based polyimides, PT cyanate esters, bismaleimides, phthalonitriles, and Avimid N; the thermal protection layer includes an ablative insulator; the thermal protection layer includes one or more materials selected from a group including chopped quartz, carbon, and silica fiber-reinforced phenolic resins; the control assembly includes a control shaft connected to the frame; the control shaft is formed from a refractory material; and/or the frame is generally planar, and the control vane further comprises an integral blast shield extending in a plane that is generally perpendicular to the plane of the frame.

The dissolvable control vane of another embodiment further includes a control assembly connected to the frame for controlling the orientation of the vane.

In accordance with another aspect of the invention, a thrust vector control system for a missile having a motor for propelling the missile that creates an exhaust plume, including a dissolvable control vane and a control assembly for controlling the orientation of the control vane. The system is mountable to the missile such that the control vane is within a path of the exhaust plume.

In accordance with another aspect of the invention, a missile includes a motor for propelling the missile that creates an exhaust plume, and a dissolvable control vane mounted within a path of the exhaust plume.

In accordance with yet another aspect of the invention, a method of steering a missile during launch includes the steps of placing a movable control vane in a path of an exhaust plume of the missile, launching the missile, and controllably moving the vane to steer the missile. The step of launching the missile includes igniting the motor to expel the exhaust plume and dissolving the vane within the exhaust plume within a predetermined period of time.

In accordance with one or more embodiments of the invention the step of moving the control vane includes moving the control vane to provide pitch, yaw and roll control.

In accordance with yet another aspect of the invention, a method of making a dissolvable missile control vane includes forming a frame from graphite-reinforced organic resins and applying a thermal protection layer to the frame.

According to one or more embodiments of the invention, the step of forming the frame includes using high temperature organic resins selected from a group including PMR-15 based polyimides, PT cyanate esters, bismaleimides, phthalonitriles, and Avimid N; the step of applying the thermal protection layer includes laminating an ablative insulator onto the frame; the step of applying the thermal protection layer includes laminating one or more materials selected from a group of chopped quartz, carbon and silica fiber-reinforced phenolic resins; the step of applying the thermal protection layer includes compression molding; applying the thermal protection layer includes wrapping continuous fiber-reinforced laminates onto the frame; the step of applying the thermal protection layer includes mechanically interlocking the thermal protection layer to the frame by drilling a plurality of holes into the frame and molding the thermal protection layer into the holes for additional adhesive attachment; the step of forming the frame includes attaching a metal shaft to the frame; and/or the step of forming the thermal protection layer includes forming the thermal protection layer over at least a portion of the shaft.

One or more embodiments may further include the step of mounting an erosion-resistant material at a forward edge of the frame; wherein the step of mounting an erosion-resistant material includes forming a carbon-carbon insert; the step of forming the carbon-carbon insert includes applying a coating formed from a material selected from a group including zirconium-diboride ceramics and hafnium-diboride ceramics, reinforced with a material selected from a group including silicon-carbide and ultra-high temperature ceramics; the step of applying the coating includes using vapor deposition; the step of applying the coating includes using a fused slurry process; the step of applying the coating includes forming a coating which generally is less than about five thousandths of an inch (0.127 mm) thick; the step of applying the coating includes using an adherent reaction-sintered material as a transitional bond layer; in the step of using the transitional bond layer includes using a material selected from a group including hafnium-carbide and hafnium-diboride; in the step of mounting an erosion-resistant material further includes applying a coating selected from a group including an oxygen permeability barrier and a volatility barrier; in the step of applying the coating includes applying a coating selected from a group including ceramic and oxide-based coatings; in the step of forming the insert includes using a material selected from a group including zirconium-diboride ceramics and hafnium-diboride ceramics that is reinforced with silicon-carbide fibers; the step of forming the insert includes using an ultra-high temperature ceramic; the step of forming includes forming an insert having a generally T-shape cross-section with the tail of the T connected to the frame; and/or the step of forming includes forming an insert having a generally U-shape cross-section with the open end of the U attached to the frame.

According to still another aspect of the invention, a thrust vector control vane, includes the combination of a frame for temporarily providing structural support, a thermal protection laminate applied at least to the frame for temporarily thermally isolating the frame, and an erosion-resistant insert connected to a leading edge of the frame for temporarily shielding the frame from particulate impacts.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

The present invention provides a thrust vector control jet vane, a jet vane control system and a missile incorporating such control vanes (also referred to as thrust vanes or jet vanes), as well as a method of making such control vanes. The control vanes form control surfaces for generating vehicle maneuvering forces by diverting the rocket exhaust plume at missile launch. The method of fabricating a composite control vane includes using both ablative organic composite materials and refractory materials. The control vanes are designed for timed destruction within the exhaust plume into granular or dust-sized particulates as sufficient velocity (referred to as the aerodynamic control velocity) is achieved and the aerodynamic control surfaces external to the airframe assume maneuvering control. The jet vane control system provided by the present invention may be incorporated into an original missile design or may be added to a missile as part of a kit or retrofit.

Figure 1:
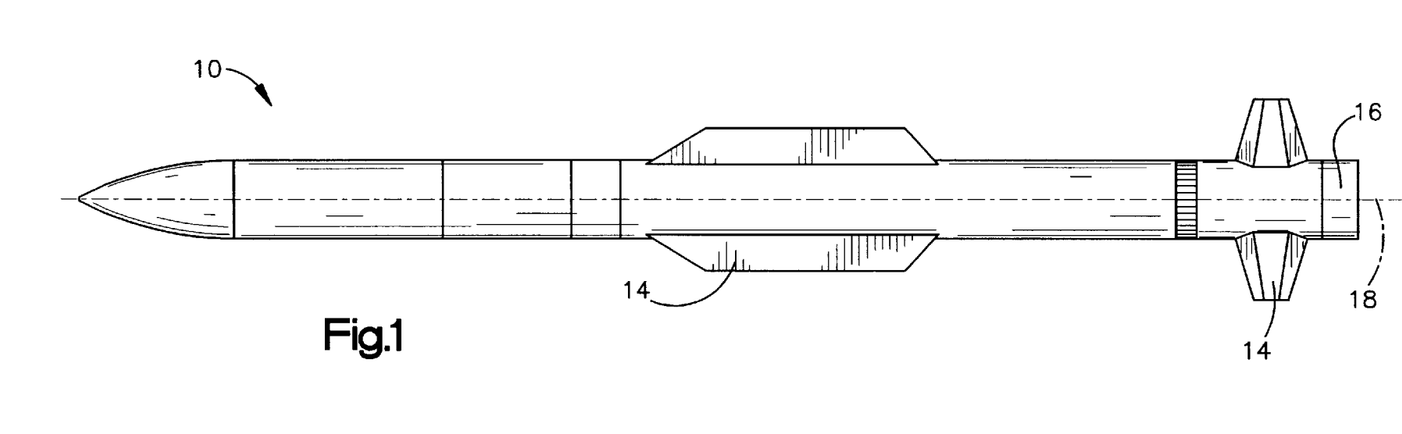
FIG. 1 is an elevation view of a missile having a jet vane control system mounted at an aft portion thereof.

An exemplary missile 10 is shown in FIG. 1. The missile has an airframe or fuselage 12 that contains a rocket motor and a missile payload (not shown). The missile also includes one or more aerodynamic control surfaces formed by wings or fins 14 extending outwardly from the fuselage to provide controlled flight once the missile attains the aerodynamic control velocity. The rocket motor generally is positioned toward a rear or aft portion 16 of the missile and provides thrust through an exhaust plume extending along a path 18 out the rear end of the missile (toward the right in FIG. 1).

Figure 2:
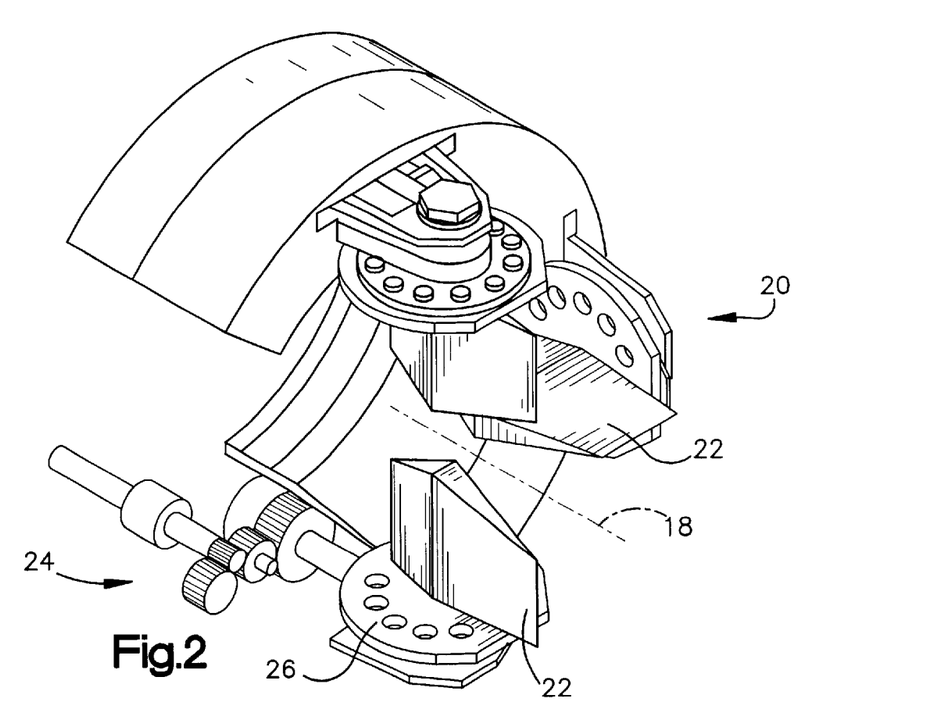
FIG. 2 is a perspective view partially broken away and partially in schematic of a portion of the jet vane control system.
Figure 3:
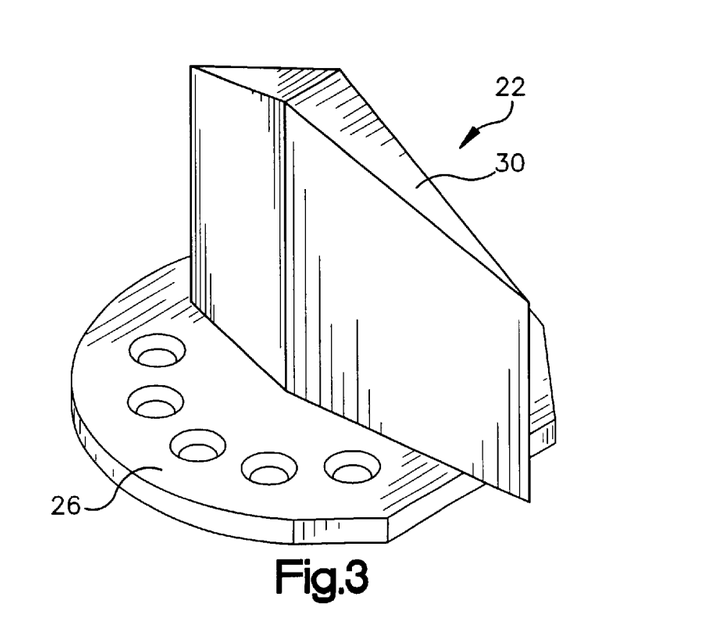
FIG. 3 is an enlarged perspective view of a control vane and blast shield from the control system shown in FIG. 2.

The jet vane control system is mounted toward the rear of the missile, generally outside the nozzle expansion cone (if any), such that the jet control vanes are positioned in the exhaust plume. As shown in FIGS. 2 and 3, the jet vane control system 20 includes a plurality of control vanes 22 extending inwardly toward the path 18 of the exhaust plume. The control system may have three or four control vanes, for example, that generally are equally circumferentially spaced about the path of the exhaust plume. The jet vane control system further includes a control assembly 24 that generally includes one or more motors, bearings, and associated gears to controllably orient the control vanes in the desired attitude relative to the path of the exhaust plume. Blast shields 26 may be provided adjacent the control vanes (and may be formed integrally with the control vanes as shown in FIG. 3) to protect components of the control assembly from the exhaust plume.

Figure 4:
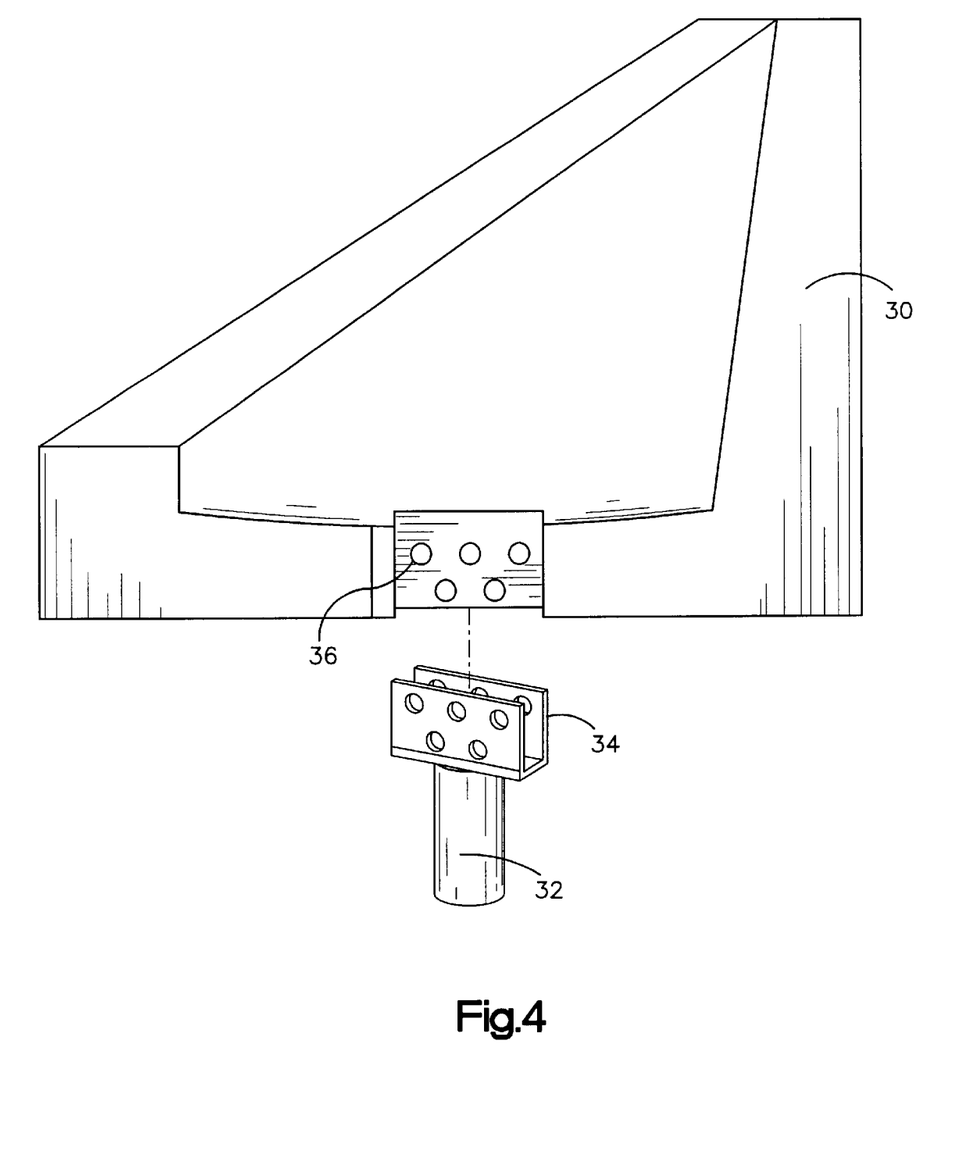
FIG. 4 is a schematic exploded view of a control vane illustrating a method of attaching a control shaft to an airfoil.
Figure 5A:
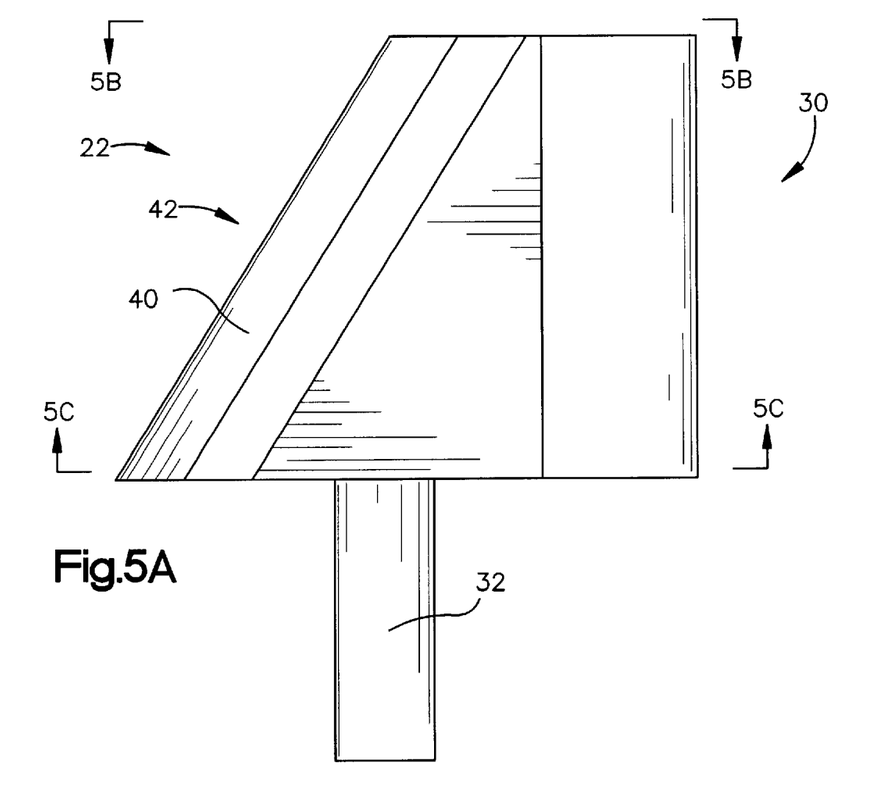
FIG. 5A is a side view of a control vane according to the present invention.
Figure 5B:
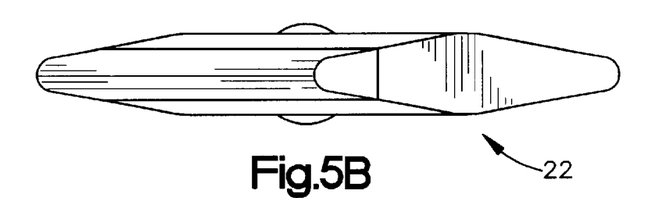
FIG. 5B is a top view of the control vane in FIG. 5A.
Figure 5C:
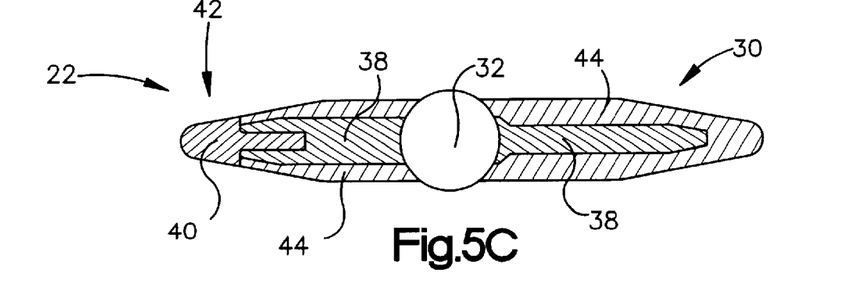
FIG. 5C is a sectional view as seen along lines 5C—5C of FIG. 5B.
Figure 6A:
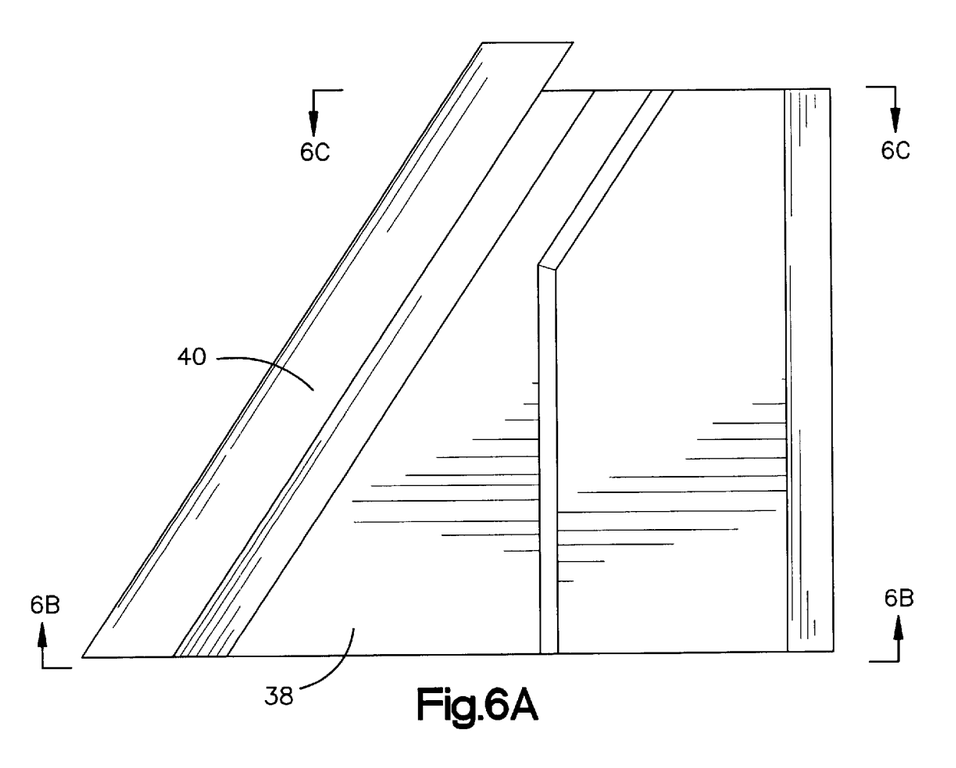
FIG. 6A is a side view of an airfoil portion of the control vane according to the present invention without a thermal protection system portion of the airfoil.
Figure 6B:
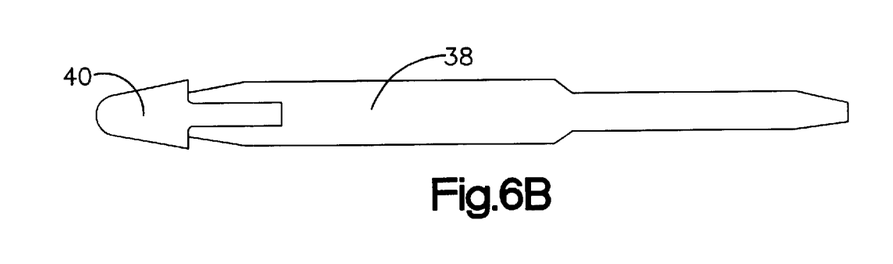
FIG. 6B is a cross-sectional view as seen along lines 6B—6B in FIG. 6A.
Figure 6C:
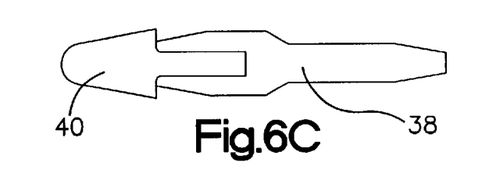
FIG. 6C is a cross-sectional view as seen along lines 6C—6C in FIG. 6A.

Referring now to FIGS. 2–4, each control vane 22 includes an airfoil 30 that forms the control surfaces that interact with the exhaust plume and a control shaft 32 that connects the airfoil to the control assembly 24. Because of this control function, the shaft also may be considered to be a part of the control assembly. Together the control assembly (FIG. 2) and the control shaft control the orientation of the airfoil in the exhaust plume. The control shaft may be a composite resin shaft formed with resin transfer molding fabrication techniques and a carbon fiber preform. Other materials having sufficient strength and temperature resistance characteristics may be used in the shaft, such as corrosion-resistant-steel (CRES) or titanium-zirconium-molybdenum (TZM) or other refractory materials. Compared to a composite resin shaft, a refractory metal shaft offers greater thermal durability under direct impingement of the exhaust plume if the shaft is not otherwise shielded. A blast shield 26 may be necessary for a composite resin shaft, introducing unnecessary complexity if not otherwise required to protect internal control assembly components.

The airfoil 30 may be formed around the shaft 32 or the shaft may be attached after the airfoil is formed. For example, as shown in FIG. 4, the shaft may have a yoke 34 sized for attachment of the shaft to the base 36 of the airfoil. The shaft may be adhesively attached to the airfoil and also may be connected to the airfoil by securing means for mechanical attachment, for example, by a mechanical fastener such as a nut and bolt combination, a rivet or a screw.

An exemplary embodiment of a control vane 22 is shown in FIGS. 5A–5C and 6A–6C, and includes a control shaft 32 and an airfoil 30. The composite airfoil includes a frame 38, a leading edge insert 40 connected to a forward edge 42 (toward the rocket motor) of the frame, and a thermal protection system (TPS) 44 laminated to the frame.

The composite frame 38 of the airfoil 30 transmits the exhaust plume-induced drag, lift, and hinge moment loads to the control shaft 32, the control assembly 24 (FIG. 2) and the fuselage 12 (FIG. 1) of the missile 10. The frame, as the primary load-bearing structure of the airfoil, is formed of a high temperature composite, such as carbon-reinforced, high temperature organic resins such as PMR-15 based polyimides, PT cyanate esters, bismaleimides, or more advanced resins such as phthalonitriles and Avimid N, although other high temperature materials having similar structural properties may be suitable. These materials generally can withstand transient thermal environments in excess of about one thousand degrees Fahrenheit (about 538° C.) for a few seconds, temperatures typical of supersonic missile applications. However, after sustained exposure to these temperatures, these materials soften, oxidize and ultimately fail as a structure, breaking down into granular particulates.

The refractory leading edge insert 40 is mounted to the forward edge 42 of the frame 38 and protects the composite frame and TPS 44 from direct impingement of the rocket motor plume, particularly from solid particulates in the exhaust plume produced by the rocket motor propellants. The refractory leading edge is designed to withstand the initial thermal shock and loading from rocket motor ignition and propellant flow until the aerodynamic control velocity is reached. However, the leading edge is not designed to be so durable as to unnecessarily prolong the life of the airfoil 30 beyond the time necessary to achieve this goal.

Figure 7A:
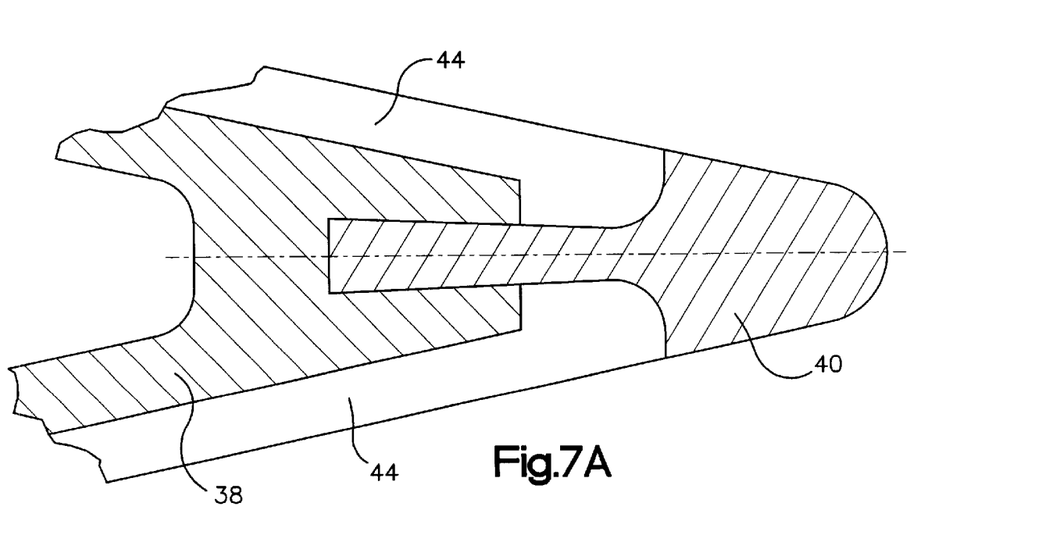
FIG. 7A, is an enlarged partial cross-sectional view of the control vane according to the present invention showing one embodiment of a leading edge portion of the airfoil.
Figure 7B:
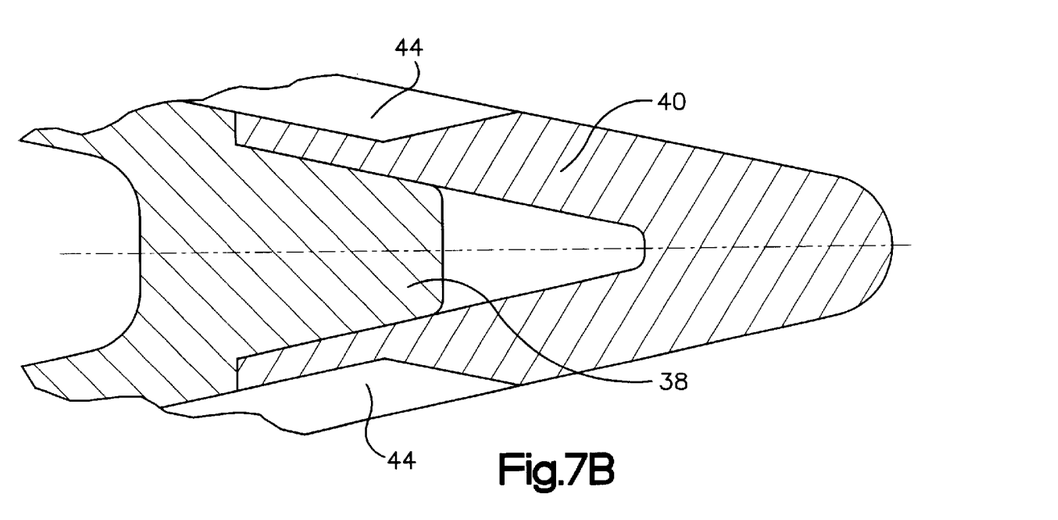
FIG. 7B is an enlarged partial cross-sectional view of the control vane showing an alternative embodiment of the leading edge portion.

FIGS. 7A and 7B show two possible configurations of the leading edge insert 40, namely a plug configuration in FIG. 7A and a shell configuration in FIG. 7B. The shape and thickness of the leading edge are carefully selected to fail in a predetermined manner and period of time. These figures are exemplary only and are not meant to be exhaustive of the possible configurations.

The leading edge is formed of an erosion-resistant material. If the leading edge 40 were fabricated from glass-, carbon- or quartz-phenolic materials, the leading edge would suffer immediate catastrophic failure within the exhaust plume. Accordingly, the leading edge has a base layer formed of a carbon-carbon composite that is protected from high temperature oxidation, for example, with a hafnium-diboride or zirconium-diboride ceramic, hafnium- or tantalum-carbide, or metallic rhenium refractory coating. These coatings may be vapor deposited, plasma sprayed or applied via a fused slurry process, for example, and are typically less than about five thousandths of an inch (less than about 0.127 mm) thick, and yet are sufficient for temporarily protecting the composite base layer.

The carbon-carbon composite base layer of the leading edge 40 may be coated with adherent reaction-sintered materials, such as a hafnium-carbide and hafnium-diboride mix, as a transition or bond layer that enables other ceramic or oxide-based protective coatings to be applied on top of the transition layer as oxygen permeability or volatility barriers. The reaction-sintered coatings are formed by a reaction between the coating, boride powder particles, for example, and the carbon in the base layer to form a surface and penetration layer with indistinct interfaces and graded composition that adheres well to the carbon-carbon substrate and improves the bonding of the protective coatings.

Alternate leading edge ceramic materials include monolithic zirconium-diboride or hafnium-diboride ceramics, reinforced with either silicate carbide fibers or particulates. These ceramics generally are known as Ultra-High Temperature Ceramics (UHTC) and have been developed for hypersonic aerospace vehicle applications such as sharp nose tips and leading edges. Both the carbon-carbon and UHTC composites can withstand high temperatures without failing, including temperatures from about four thousand to about five thousand degrees Fahrenheit (about 2204° C. to about 2760° C.).

Returning to FIGS. 5A–5C, as mentioned above, the thermal protection system, or TPS 44, is laminated to the surface of the frame 38, and may also coat the leading edge 40. The TPS provides ablative cooling and thermal insulation from propellant aeroheating by the exhaust plume, thereby temporarily enabling the composite frame to perform its structural function. The TPS laminate is fabricated from chopped quartz, carbon or silica fiber-reinforced phenolic resins, materials thoroughly characterized as ablative insulators from years of service as rocket motor nozzle components and reentry vehicle heat shields.

The TPS 44 may be formed by compression molding or by tape wrapping continuous fiber-reinforced laminates directly onto the composite frame 38 for greater insulation uniformity, ablative performance, and orthotropic material capabilities. The TPS may be mechanically interlocked to the composite frame by drilling numerous holes into the frame, filling the holes with TPS material, and curing the TPS material for consolidation. The holes may be filled during compression molding or after filling the holes with TPS material, the frame may be wrapped with TPS laminates over the airfoil edges before curing the TPS. These techniques allow the airfoil 30 to be accurately formed into any desired shape, including existing control vane shapes that are formed of non-dissolvable metallic materials.

TPS materials generally lack sufficient structural strength and rigidity to function as a control vane 22 without the structural support provided by the frame 38, and generally erode too rapidly to permit the control vane to withstand the particulate flow within the exhaust plume without the refractory leading edge 40. However, an airfoil 30 produced in accordance with the present invention uses the combination of these elements to form a superior control vane with the advantages described herein.

The thrust control vane 22 formed in accordance with the present invention has a substantially repeatable and predictable failure mechanism designed to function within a predetermined time envelope of known probabilistic tolerances. The control vane 22 and airfoil 30 formed in accordance with the present invention fail by gracefully disintegrating, i.e., by dissolving into granular and/or dust-sized particulates within a predictable time period. The airfoil 30 generally does not include metal components because metals generally are more likely to shatter and break apart into large pieces rather than dissolve into granular particulates.

The control vanes 22 in the thrust vane control system 20 are designed to dissolve substantially simultaneously to minimize disruption of the stability of the missile in its flight along the intended trajectory. The failure of the composite airfoil 30 can be controlled by carefully selecting the composition of the airfoil subcomponents. Most high temperature organic composites have glass transition temperatures (Tg) from about six hundred to about eight hundred degrees Fahrenheit (about 316° C. to about 427° C.), where continuous thermal exposure does not result in material degradation. Above the glass transition temperature, and after a period of thermal soak, all organic composites begin to outgas volatiles and to oxidize. The TPS 44 laminates insulate the composite frame 38 to within the glass transition temperature during launch and pitch-over, typically less than a couple of seconds, after which significant ablation degrades the TPS laminate and its ability to cool the frame, and the frame temperature begins to rise. Ultimately, the TPS laminate either is exhausted via ablation, or delaminates from outgassing of the frame material as the frame materials exceed their glass transition temperatures. Either way, once the composite frame is exposed to the exhaust plume, substantially instantaneous ignition and/or disintegration of the frame occurs. The refractory leading edge 40 similarly disintegrates, both from the lack of structural support as the composite frame dissolves and from the inherent brittleness of the refractory materials used to form the leading edge.

Depending on the particular manufacturer, phenolic TPS recession rates are typically about ten hundredths of an inch (about 254 micrometers) or more per second in exhaust plume environments exhibiting temperatures above about four thousand degrees Fahrenheit (about 2204° C.) and containing a significant amount of solid particulates. The greater the particulate flow, the faster the TPS 44 erosion. In fact, a rocket motor having a dual grain propellant design may be configured specifically to eject two plumes of different particulate percentages. The first grain incorporates a low particulate flow to reduce smoke about a surface ship and its sensors, for example, during missile launch, as well as helping to assure survivability of the control vanes 22 until the aerodynamiccontrol velocity is reached. The second, commencing immediately after the first grain is exhausted, incorporates a higher particulate content to increase specific impulse and thrust for powered flight. The enhanced particulate flow and higher stagnation temperature (delta T greater than about five hundred degrees Fahrenheit (about 260° C.)) of the second grain greatly increase the TPS 44 erosion and frame 38 disintegration processes, making simultaneous destruction of all of the control vanes more likely. However, an autopilot-initiated roll maneuver designed to overload all of the thrust vector control composite frames, assuming the TPS is nearing depletion, can facilitate simultaneous destruction of the jet vanes after pitch-over for assured cruise flight trim and control.

A secondary failure mechanism can be designed-into the control vane 22 to take advantage of a past-perceived disadvantage in utilizing coated carbon-carbon composite components in rocket motor environments with stagnation temperatures above about six thousand degrees Fahrenheit (about 3316° C.). Carbon-carbon composites are known to outgas volatiles and spal refractory coatings about ten to about fifteen seconds after ignition of the rocket motor. The outgassing leads swiftly to catastrophic failures from rapid propellant-induced carbon-carbon oxidation and particulate erosion. Once the refractory leading edge 40 has disintegrated, the composite frame 38 and thermal protection system 44 are exposed to propellant impingement, causing rapid erosion and disintegration.

Another secondary failure mechanism is triggered by the high thermal conductivity of refractory materials. Carbon-carbon and UHTC materials can withstand a great amount of thermal shock due to low thermal coefficients of expansion and high heat conduction characteristics. Once propellent impingement is initiated, the refractory leading edge material "soaks up" the thermal energy from the plume environment and conducts that heat into the composite frame 38. As the frame temperature rises above the glass transition temperature, outgassing, oxidation and loss of structural support for the leading edge 40 rapidly lead to carbon-carbon or UHTC cracking and material failure. Once the leading edge fails, the composite frame is exposed to direct propellant flow, and the frame rapidly disintegrates.

Timing the exhaustion of the TPS 44 to occur just prior to secondary leading edge spalling and disintegration provides two mechanisms to expose the composite frame 38 to the rocket plume environment and ultimate vaporization. These failure mechanisms can be designed to occur within a desired time envelope with modern thermodynamic finite element modeling and recession rate analysis, as well as material testing techniques currently performed when designing any thrust vane control system 20.

A method of steering the missile 10 (FIG. 1) during launch includes placing the thrust vector control vanes 22 in the aft portion 16 of the missile so that the vanes extend into the path 18 of the rocket exhaust plume. The vanes are connected to a steering control system 20 to enable controllable movement of the vanes during launch in order to maneuver the missile until an aerodynamic control velocity is reached. In operation, the missile is loaded in a substantially vertical canister for launch. When a threat is recognized and the rocket engine is ignited to launch the missile, the missile is maneuverable immediately upon launch by controllably varying the orientation of the control vanes 22 within the rocket exhaust plume for complete roll, pitch and yaw maneuvers. After a few seconds, the missile 10 will have pitched-over, attained aerodynamic control velocity, and the thrust vector control vanes will dissolve in the exhaust plume, thereby reducing missile weight and improving thrust control and trim. Thereafter, the missile will seek and destroy its target in the usual manner.

In summary, the dissolvable thrust vector control jet vanes 22 utilize a high temperature composite material frame 38 that forms the primary load carrying structure. An ablative organic composite thermal protection system (TPS) 44 is laminated onto the composite frame for temporary thermal isolation from propellant aeroheating. A leading edge insert 40 bonded to the forward edge 42 of the composite frame provides temporary protection from direct particulate impact in the erosive rocket motor nozzle environment on the TPS and frame. After the leading edge erodes, and generally after the TPS is exhausted in a timely pre-determined manner based in part on the thickness of the applied TPS laminates, the composite control vane dissolves in the exhaust plume into granular particulates.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer that performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

What is claimed is:

1. A dissolvable thrust vector control vane for mounting in a rocket nozzle so as to be in the path of an exhaust plume from a rocket motor, comprising a frame mountable to extend within the nozzle, a thermal protection layer on at least a portion of the frame, and an erosion-resistant material at a forward edge of the frame, wherein the erosion resistant material and the thermal protection layer are selected to withstand conditions in the exhaust plume for a predetermined time, and wherein at least the frame and the thermal protection layer dissolve in the exhaust plume after the predetermined period of time has elapsed.

2. A missile comprising a motor for propelling the missile that creates an exhaust plume, and a control vane as set forth in of claim 1 mounted within a path of the exhaust plume.

3. A dissolvable control vane as set forth in claim 1, wherein the erosion-resistant material forms an insert that is mounted to the forward edge of the frame.

4. A dissolvable control vane as set forth in claim 3, wherein the insert includes a carbon-carbon structure and a surface coating on the structure selected from a group including a ceramic, a carbide, and a metallic material.

5. A dissolvable control vane as set forth in claim 4, wherein the surface coating includes one or more materials selected from the group including a hafnium-diboride ceramic, a zirconium-diboride ceramic, a hafnium-carbide, a tantalum-carbide, and a metallic rhenium refractory coating.

6. A dissolvable control vane as set forth in claim 4, wherein the surface coating generally has a thickness of less than about five thousandths of an inch (0.127 mm) thick.

7. A dissolvable control vane as set forth in claim 3, wherein the insert further includes one or more materials selected from a group including ceramic and oxide-based oxygen permeability and volatility barriers.

8. A dissolvable control vane as set forth in claim 3, wherein the insert has a generally T-shape cross-section with the tail of the T connected to the frame.

9. A dissolvable control vane as set forth in claim 3, wherein the insert has a generally U-shape cross-section with the open end of the U attached to the frame.

10. A dissolvable control vane as set forth in claim 1, wherein the frame includes graphite-reinforced organic resins.

11. A dissolvable control vane as set forth in claim 10, wherein the graphite-reinforced organic resins are carbon-reinforced, high temperature organic resins that include one or more resins selected from a group including: PMR-15 based polyimides, PT cyanate esters, bismaleimides, phthalonitriles, and Avimid N.

12. A dissolvable control vane as set forth in claim 1, wherein the thermal protection layer includes an ablative insulator.

13. A dissolvable control vane as set forth in claim 12, wherein the thermal protection layer includes one or more materials selected from a group including chopped quartz, carbon, and silica fiber-reinforced phenolic resins.

14. A jet vane assembly, comprising a dissolvable control vane as set forth in claim 1, and a control assembly connected to the frame for controlling the orientation of the vane.

15. A vane assembly as set forth in claim 14, wherein the control assembly includes a control shaft connected to the frame.

16. A vane assembly as set forth in claim 15, wherein the control shaft is formed from a refractory material.

17. A dissolvable control vane as set forth in claim 1, wherein the frame is generally planar, and the control vane further comprises an integral blast shield extending in a plane that is generally perpendicular to the plane of the frame.

18. A thrust vector control system for a missile having a motor for propelling the missile that creates an exhaust plume, comprising a control vane as set forth in claim 1 and a control assembly for controlling the orientation of the control vane, the system being mountable to the missile such that the control vane is within a path of the exhaust plume.

19. A method of steering a missile during launch, comprising providing the control vane of claim 1, placing the control vane in a path of an exhaust plume of the missile, launching the missile, and controllably moving the vane to steer the missile, wherein launching the missile includes igniting the motor to expel the exhaust plume and dissolving at least the frame and the thermal protection layer of the vane within the exhaust plume within a predetermined period of time.

20. A method of steering a missile during launch as set forth in claim 19, wherein igniting the motor includes igniting a dual grain propellant including igniting a first grain creating a low particulate flow and then igniting a second grain creating a higher particulate flow.

21. A method of steering a missile during launch as set forth in claim 19, wherein moving the control vane includes moving the control vane to provide pitch, yaw and roll control.

22. A method of making a dissolvable thrust vector control vane for mounting in a rocket nozzle in the path of an exhaust plume from a rocket motor, comprising forming a frame from graphite-reinforced organic resins, mounting an erosion-resistant material at a forward edge of the frame, applying a thermal protection layer to at least a portion of the frame and selecting the erosion resistant material and the thermal protection layer to withstand conditions in the exhaust plume for a predetermined time after which at least the frame and the thermal/protection layer dissolve in the exhaust plume.

23. A method as set forth in claim 22, wherein forming the frame includes attaching a metal shaft to the frame.

24. A method as set forth in claim 22, wherein forming the frame includes using high temperature organic resins selected from a group including PMR-15 based polyimides, PT cyanate esters, bismaleimides, phthalonitriles, and Avimid N.

25. A method as set forth in claim 22, wherein applying the thermal protection layer includes laminating an ablative insulator onto the frame.

26. A method as set forth in claim 25, wherein applying the thermal protection layer includes laminating one or more materials selected from a group of chopped quartz, carbon and silica fiber-reinforced phenolic resins.

27. A method as set forth in claim 22, wherein applying the thermal protection layer includes compression molding.

28. A method as set forth in claim 22, wherein applying the thermal protection layer includes wrapping continuous fiber-reinforced laminates onto the frame.

29. A method as set forth in claim 22, wherein applying the thermal protection layer includes mechanically interlocking the thermal protection layer to the frame by drilling a plurality of holes into the frame molding the thermal protection layer into the holes for additional adhesive attachment.

30. A method as set forth in claim 23, wherein forming the thermal protection layer includes forming the thermal protection layer over at least a portion of the shaft.

31. A method as set forth in claim 22, wherein forming includes forming an insert having a generally T-shape cross-section with the tail of the T connected to the frame.

32. A method as set forth in claim 22, wherein forming includes forming an insert having a generally U-shape cross-section with the open end of the U attached to the frame.

33. A method as set forth in claim 32, wherein mounting an erosion-resistant material includes forming a carbon-carbon insert.

34. A method as set forth in claim 33, wherein forming the carbon-carbon insert includes applying a coating formed from a material selected from a group including zirconium-diboride ceramics and hafnium-diboride ceramics, reinforced with a material selected from a group including silicon-carbide and ultra-high temperature ceramics.

35. A method as set forth in claim 34, wherein applying the coating includes using vapor deposition.

36. A method as set forth in claim 34, wherein applying the coating includes using a fused slurry process.

37. A method as set forth in claim 34, wherein applying the coating includes forming a coating which generally is less than about five thousandths of an inch (0.127 mm) thick.

38. A method as set forth in claim 34, wherein applying the coating includes using an adherent reaction-sintered material as a transitional bond layer.

39. A method as set forth in claim 38, wherein using the transitional bond layer includes using a material selected from a group including hafnium-carbide and hafnium-diboride.

40. A method as set forth in claim 34, wherein mounting an erosion-resistant material further includes applying a coating selected from a group including an oxygen permeability barrier and a volatility barrier.

41. A method as set forth in claim 40, wherein applying the coating includes applying a coating selected from a group including ceramic and oxide-based coatings.

42. A method as set forth in claim 33, wherein forming the insert includes using a material selected from a group including zirconium-diboride ceramics and hafnium-diboride ceramics that is reinforced with silicon-carbide fibers.

43. A method as set forth in claim 33, wherein forming the insert includes using an ultra-high temperature ceramic.

* * * * *